Figure 1:
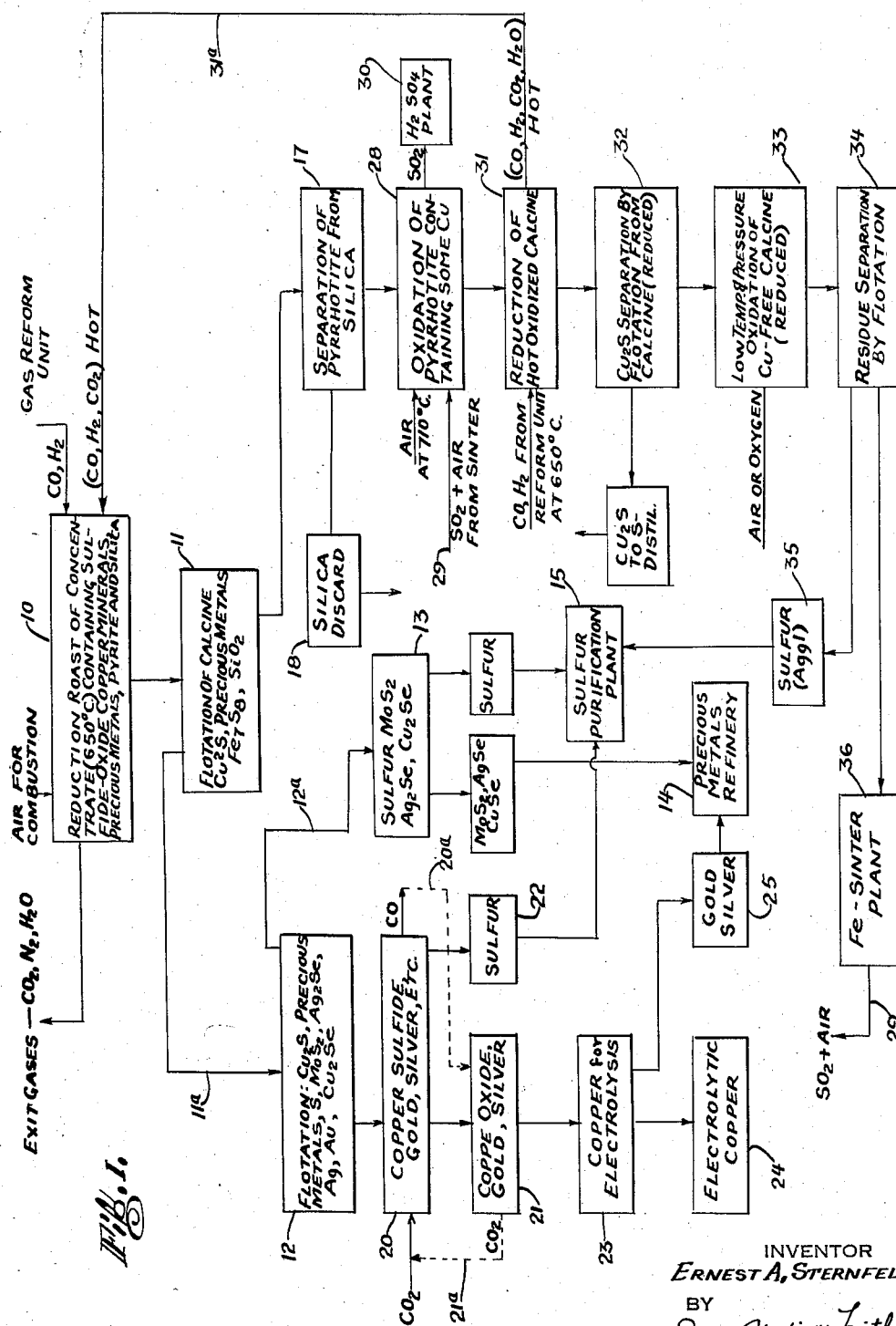

March 17, 1959  E. A. STERNFELS  2,878,102
RECOVERY OF METALLIC AND NON-METALLIC VALUES FROM
SULFIDE AND SULFIDE-OXIDE ORES
Filed Nov. 30, 1955  2 Sheets-Sheet 1

INVENTOR
ERNEST A. STERNFELS
BY
Davis, Hoxie & Faithfull
ATTORNEYS

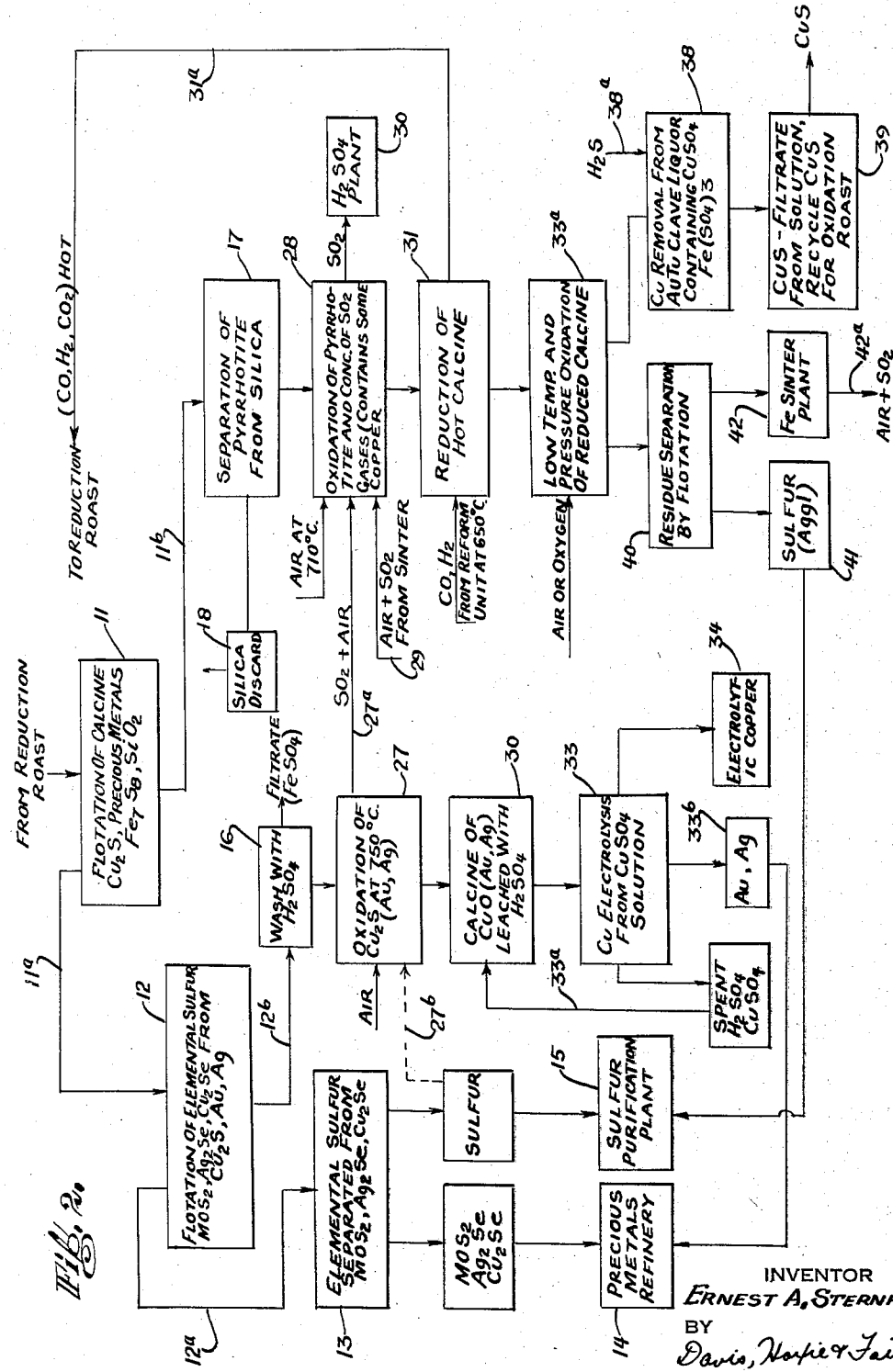

2,878,102

RECOVERY OF METALLIC AND NON-METALLIC VALUES FROM SULFIDE AND SULFIDE-OXIDE ORES

Ernest A. Sternfels, New York, N. Y., assignor to Continental Ore Corporation, New York, N. Y., a corporation of New York Application November 30, 1955, Serial No. 550,017

6 Claims. (Cl. 23—147)

This invention relates to the treatment of sulfide or sulfide-oxide ores, or their concentrates, to recover valuable products therefrom. It has particular reference to an improved method for recovering non-ferrous metals, precious metals, sulfur and iron (as iron oxide) from these ores or concentrates, which will be designated generally as sulfide ores.

The recovery of metal from sulfide ores and especially from copper-containing sulfide ores is complicated by the fact that copper deposits usually include more than one copper mineral. These minerals have different chemical and physical properties, and they have different responses to flotation agents. The usual copper sulfides are chalcocite and chalcopyrite, the former characteristic of secondary, the latter of primary deposits. Bornite is fairly common in copper deposits; covellite is mostly present in minor amounts, particularly in ores containing sensible amounts of precious metals. The iron mineral in copper ores is generally pyrite, although pyrrhotite may constitute an important part. Of the precious metal values in copper ores, gold and silver are usually associated with the copper minerals. In some cases gold is also combined with the pyrite, but never with the pyrrhotite. Molybdenum appears mostly as molybdenite, and as such sometimes in intergrowth with pyrite or copper sulfide; and sometimes it forms a fine coating on small (100 mesh) silica particles. Selenium appears in various mineral forms, such as naumanite ($Ag_2Se$), klockmanite ($Cu_2Se$) or seleniumtellurides.

The average copper content of copper-containing sulfide ores is very low, about 1–2%. The raw material therefore warrants a concentration step by flotation or other means before undergoing treatment for the recovery of its metal values. The flotation of chalcopyrite and bornite from pyrite is much more difficult than the separation of covellite and chalcocite. The separation of the former requires a close control of operation conditions and is never complete, and consequently the flotation concentrates contain various amounts of pyrite. The precious metals are found in the concentrate due to their association with the copper-bearing minerals or minerals of similar flotation characteristics. Frequently, however, the separation from pyrite is not economical, if the pyrite as well as the copper minerals carry precious metal values. An average copper concentrate from the huge "porphyry" ore bodies in Arizona, New Mexico and Utah contains 25–30% copper and equal percentages of sulfur and iron. Some of these deposits contain sensible amounts of gold, silver, molybdenum and selenium. The mineral composition of the concentrates consists of various amounts of chalcocite, chalcopyrite, bornite and covellite, and some smaller amounts of copper oxides, such as malachite, azurite and chrisocolla, and of pyrite as the iron mineral.

The conventional process for the recovery of copper sometimes utilizes part of the sulfur content from the concentrate, in the form of sulfur-dioxide, for the manufacture of sulfuric acid. The remaining sulfur and all of the iron present in the concentrate are used as fuels for the smelting operation. The sulfur is thereby lost as sulfur-dioxide in the flue gases. The iron is burnt to iron oxide, which forms a worthless slag with the silica. Even with hydro-metallurgical extraction methods for the copper, only part of the total sulfur from the concentrate can be used for the production of sulfuric acid, and the leaching residue of the calcine produced does not yield a commercial iron oxide. The recovery of precious metals is difficult, since they have a tendency to volatilize when roasted with air. Molybdenum and selenium, for example, must be recovered to a great extent as molybdenum and selenium oxides from the flue gases. The non-volatilized part of the precious metals is then recovered in the process of electrolytic refining of the copper.

The principal object of the present invention is to provide an improved method of treating sulfide or mixed sulfide-oxide ores or their concentrates for the recovery of non-ferrous metals, precious metals, sulfur and iron, as iron oxide.

For illustrative purposes, the invention will be described in connection with the treatment of a copper concentrate of approximately the above-mentioned mineral composition, obtained from the "porphyry" ore bodies, although it will be understood that the invention is applicable generally to the treatment of copper-containing ores of the sulfide type.

In a recovery treatment practiced according to the invention, I first transform the various copper minerals of the ore concentrate into cuprous-sulfide and the iron mineral into pyrrhotite, by roasting the concentrate in a non-oxidizing atmosphere to remove part of the sulfur, which was originally present in excess of the stoichiometric composition of the cuprous-sulfide and pyrrhotite. As a result, a calcine is produced which is readily amenable to subsequent separation of its mineral constituents. This calcine is subjected to a primary flotation step to separate the cuprous-sulfide, the precious metals and the sulfur from the pyrrhotite and other material of similar flotation characteristics. The overflow from this primary separating step is then subjected to a second flotation to provide an overflow including elemental sulfur and precious metals, which can be subsequently separated from the sulfur by conventional means. The underflow from this second flotation, which includes mainly cuprous-sulfide with some precious metals, is washed with sulfuric acid to remove the pyrrhotite and is then treated to recover copper and sulfur from the sulfide and to recover the precious metals. The underflow from the primary flotation can be separated from the gangue materials and the pyrrhotite treated for recovery of sulfur and iron oxide and any remaining copper.

A further feature of the invention resides in the manner of recovering copper and sulfur from the cuprous-sulfide. According to this feature, the cuprous-sulfide is fed into a fluo-solids reactor or flash roaster where it is roasted with carbon-dioxide gas to produce copper oxide, carbon-monoxide and elemental sulfur. The copper oxide is then treated in a conventional manner to obtain metallic copper and recover any precious metals. If the copper oxide is reduced in a shaft furnace, the carbon-monoxide from the previous roasting of the cuprous-sulfide can be used for the reduction, and the resulting carbon-dioxide can be recycled to this roasting operation for distillation of the sulfur from the cuprous-sulfide. Alternatively, the cuprous-sulfide can be smelted as a matte in a converter to obtain elemental copper and produce sulfur-dioxide in the flue gas.

If sulfur-dioxide is required for production of sulfuric acid, the cuprous-sulfide can be given an oxidation roast in a fluo-solids reactor or flash roaster to produce a calcine of copper oxide particles, which can be dissolved in sulfuric acid for electrolytical recovery of metallic copper.

The sulfur-dioxide content of the exit gases from the oxidation roast can be enriched by using them for roasting of the pyrrhotite to recover the sulfur and iron oxide therefrom, or by admixing sulfur (from the overflow of the second flotation previously mentioned) with the charge going into this oxidation roast.

Still another feature of the invention resides in the manner of treating the pyrrhotite to recover sulfur and iron oxide, while providing sulfur-dioxide suitable for the production of sulfuric acid. According to this feature, the pyrrhotite is given an oxidation roast in an atmosphere of air and/or sulfur-dioxide, the latter being obtained from the previously mentioned oxidation of cuprous-sulfide. The resulting hot calcine is subjected to a reduction roast to reduce the superficially oxidized pyrrhotite particles to ferric-iron oxide and pyrrhotite, and to convert the copper oxide into cuprous-sulfide. The reducing gas used for this roast may be the same as that used for reduction of the ore concentrate, and the hot exit gas from this roast may be used for such reduction of the ore concentrate. The cuprous-sulfide can be removed from the reduced calcine by flotation, leaving a copper-free pyrrhotite-iron oxide calcine which is then subjected to a low temperature and pressure oxidation leach for recovery of elemental sulfur and iron as iron oxide.

For a better understanding of the invention, reference may be had to the accompanying drawings, in which Figs. 1 and 2 are flow sheets illustrative of two different forms of the new method.

Referring to the drawings, the concentrate (or tailings) is first roasted in a reducing or non-oxidizing atmosphere at a temperature of about 650° C. This roasting operation may be performed in a multiple hearth furnace 10, such as a multiple hearth Nichols-Herreshoff roaster. A gas mixture of carbon-monoxide and hydrogen, as produced in the water-gas shift reaction, or any other suitable reducing gas mixture, may be used in the roasting for reduction of the concentrate.

The gases leaving the reduction furnace 10, comprising carbonylsulfide, hydrogen-sulfide and unreacted feed gases, should be burned in a manner such that the combustion products are elemental sulfur rather than sulfur-dioxide. The heat liberated from this combustion may be used for heating the concentrate entering the top hearth of the furnace.

The roasting operation in the furnace 10 serves to transform the various copper minerals of the concentrate into cuprous-sulfide and the iron minerals into pyrrhotite, by removing the sulfur which is in excess of the stoichiometric composition. Thus, a calcine is produced which is readily amenable to separation of its mineral constituents.

The main chemical reactions occuring in the roasting of the concentrate in a reducing atmosphere at 10 are as follows.

(a) For chalcopyrite:

$$2CuFeS_2 \rightarrow Fe_2Cu_2S_3 + S$$
$$Fe_2Cu_2S_3 \rightarrow 2FeS + Cu_2S$$

(b) For covellite:

$$2CuS \rightarrow Cu_2S + S$$

The reaction occurs in an atmosphere of hydrogen between 500–600° C., in an atmosphere of carbon-monoxide between 300–400° C.

(c) For pyrite:

$$7FeS_2 \rightarrow Fe_7S_8 + 6S$$

The reaction yields a pyrrhotite, which is suitable for the production of sulfur-dioxide of a commercial strength.

(d) For copper-silicate (chrysocolla):

$$CuSiO_3 \rightarrow Cu + SiO_2 + H_2O \text{ and } CO_2$$

(e) For metallic copper:

$$Cu + S \rightarrow CuS$$
$$Cu + H_2S \rightarrow CuS + H_2$$

Metallic copper liberated during the reduction is immediately oxidized by the sulfur-containing gases in the furnace. The reaction which takes place very readily is catalyzed in the presence of moisture.

(f) For cuprite and tenorite:

$$Cu_2O + H_2S \rightarrow Cu_2S + H_2O \text{ and } CO_2$$
$$CuO + H_2S \rightarrow CuS + H_2O \text{ and } CO_2$$

(g) For copper-carbonate (malachite):

$$CuCO_3Cu(OH)_2 \rightarrow 2CuO + CO_2 + H_2O$$

(h) For sulfur:

$$S + H_2 \rightarrow H_2S$$
$$S + CO \rightarrow COS$$

(i) For gold: superficially oxidized gold is reduced by the action of hydrogen or carbon-monoxide. Gold values locked into pyrite particles are liberated. Gold is not attacked by sulfur or its gases.

(j) For silver: Silver is even more susceptible to the action of sulfur and its gases than copper. Therefore it shows similar reactions.

(k) For selenium:

$$2Ag + Se \rightarrow Ag_2Se$$
$$Ag_2S + Se \rightarrow Ag_2Se + S$$
$$2Cu + Se \rightarrow Cu_2Se$$

Silver and copper-selenides are very stable compounds and they are not decomposed by the action of the reducing gases even at a dull red heat.

(1) For molydenum: Molybdenum-sulfide is not reduced by hydrogen or carbon-monoxide at temperatures above 850° C.

The calcine from the roasting furnace 10 comprises cuprous-sulfide, gold, silver-sulfide, molybdenite, silver and copper selenides, elemental sulfur, pyrrhotite and silica. This calcine is fed to a flotation step at 11. There the cuprous-sulfide, precious metals and surfur are separated as an overflow from an underflow comprising the pyrrhotite, undecomposed chalcopyrite and bornite, and silica, using an aethylxanthate or aerofloat as the collecting agent, pine oil as the frothing agent, and lime or soda ash as a depressant for the pyrrhotite. A pH of at least 7 is maintained in this flotation step.

The overflow 11a from the flotation cells at 11 is steamed to destroy the xanthate coatings, and is then fed to a flotation step 12, where the elemental sulfur together with the bulk of the molybdenites and selenides are floated with neutral oil. This overflow 12a passes to a conventional operation for separating the precious metals from the sulfur, such conventional operation being indicated at 13. The precious metals separated at 13 may go to a refinery 14, while the sulfur can be delivered to a purification plant 15.

The underflow 12b from the flotation 12 comprises copper-sulfide, gold, silver-sulfide and some molybdenites and selenides. This underflow 12b is washed in dilute sulfuric acid to remove the pyrrhotite impurities, as at 16 in Fig. 1, and is then dewatered and dried.

The underflow 11b from the flotation 11 is separated from the gangue materials or silica at 17, as by flotation or magnetic separation, the silica being discarded at 18.

As a subsequent stage of the process, the underflow 12b is treated to recover the copper and sulfur from the cuprous-sulfide and to recover the precious metals. According to Fig. 1, this treatment is effected by first feeding the underflow 12b into a fluo-solids reactor or flash roaster 20, where it is roasted with carbon-dioxide gas at a temperature of about 750° C. The reaction which then takes place is as follows:

$$Cu_2S + CO_2 \rightarrow Cu_2O + CO + S$$

It will be noted that the silver-sulfide, silver-selenide and molybdenite do not take part in this reaction at 20.

The copper oxide from the roasting 20, which contains gold and silver, is treated for the production of metallic copper and the recovery of the precious metals. As shown in Fig. 1, the copper oxide and precious metals are passed from the roasting operation 20 to a shaft furnace 21, where it is reduced with carbon-monoxide from the roasting 20, as indicated by the broken line 20a. The oxidized carbon-monoxide from the reduction 21 can be recycled as $CO_2$ for distillation of the sulfur from the copper sulfide at 20, as indicated by the broken line 21a.

The sulfur from the roasting 20 is collected at 22 and fed to the sulfur purification plant 15. The metallic copper and precious metals from the reduction at 21 are subjected to electrolysis at 23, the electrolytic copper being drawn off at 24 and the precious metals being collected at 25 for subsequent transfer to the conventional refining operations at 14.

An alternative treatment of the underflow 12b is illustrated in Fig. 2, wherein sulfur dioxide is obtained for the production of sulfuric acid. As shown in Fig. 2, the overflow 12b, after being washed at 16 as previously described, is given an oxidation roast with air in a fluosolids reactor or flash roaster 27 at a temperature of about 750° C. The resulting reaction is:

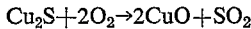
$$Cu_2S + 2O_2 \rightarrow 2CuO + SO_2$$

The exit gases 27a from the roasting at 27 contain sulfur-dioxide which is subsequently enriched. This enrichment can be effected by recycling the exit gases 27a through the roasting operation 27. Preferably, however, it is obtained by feeding the exit gases 27a to a fluo-solids reactor or flash roaster 28 where the pyrrhotite from the underflow 11b is roasted, as will be described in greater detail presently. Alternatively, the sulfur-dioxide content of the exit gases 27a can be increased by mixing the sulfur from the separation step 13 (which may be a flotation step) with the charge in the oxidation roast 27, as indicated at 27b. The latter has the further advantage of increasing the heat value of the feed for the roaster 27.

The calcine obtained from the oxidation roast 27 does not contain iron but comprises small copper oxide particles which are readily soluble in sulfuric acid. Accordingly, I prefer to dissolve these copper oxide particles in sulfuric acid, as shown at 30 in Fig. 2, to condition them for electrolytic recovery of metallic copper at 33. The electrolyte used in the recovery step 33 is continuously depleted in copper, and the spent solution from the electrolytic cells 33 is simply used over again as solvent in the leaching of copper oxide calcine at 30, as indicated at 33a. The precious metals are recovered from the mud of the electrolytic cells, as shown at 33b, and passed to the refining operation 14, although some of the molybdenum and selenium is present in the exit gases 27a and may be recovered therefrom. The electrolytic copper is withdrawn at 34.

The recovery of the sulfur and iron as iron oxide from the underflow 11b differs in Figs. 1 and 2. According to Fig. 1, the pyrrhotite from the separating step 17 is given an oxidation roast in the fluo-solids reactor or flash roaster 28 at a temperature of about 750° C. to avoid formation of sulfates. The roaster 28 may be supplied with air as well as $SO_2$-containing gases fed at 29 from a subsequent sintering operation to be described presently. The exit gases from this roaster, which contain substantial amounts of $SO_2$, are passed to a sulfuric acid plant 30. In most cases, dead-roasting of the pyrrhotite is not undertaken because of technical and economical difficulties. Therefore, and in order to make the resulting calcine amenable for the recovery of elemental sulfur and iron by the conventional low temperature and oxidation leach, the pyrrhotite should not be roasted to iron to sulfur molar ratios lower than 1:0.4 or 1:0.5.

The calcine obtained from the oxidation roast 28 comprises oxidized pyrrhotite, various forms of iron oxides, and copper sulfides and oxides originating from the small amounts of copper-sulfide, undecomposed chalcopyrite and bornite left from the previous flotation step 11. This hot calcine is conveyed from roaster 28 into a Herreshoff furnace 31 where it is given a short-time reduction roast at about 650° C. to make it amendable for recovery of elemental sulfur and iron by the low temperature and pressure oxidation leach. This reduction roast cleans the superficially oxidized (and therefore chemically inert) pyrrhotite particles by reducing them to ferric-iron oxide and pyrrhotite. Also, the reduction roast 31 converts the copper oxide present to copper-sulfide, as follows:

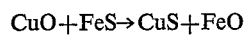
$$CuO + FeS \rightarrow CuS + FeO$$

or

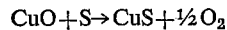
$$CuO + S \rightarrow CuS + \tfrac{1}{2}O_2$$

For the reduction roast 31, the same reducing gas mixture may be used as was used for the reduction of the concentrate at 10. Preferably, the hot exit gases from the reduction furnace 31 are introduced into the roaster 10 where the concentrate is reduced, as shown at 31a.

The copper sulfide is removed from the reduced calcine by flotation at 32, in order to facilitate the low temperature and pressure oxidization of the pyrrhotite-iron oxide calcine at 33. The copper can also be removed as soluble copper sulfate if the oxidation roast at 28 is carried out at about 680° C. (Dorr process), although this method is less desirable because of economic factors.

As shown in Fig. 1, the material from the leaching operation 33 is subjected to flotation at 34 to separate the elemental sulfur from the iron oxide, the sulfur being collected at 35 and passed to the purification plant 15. The iron oxide is passed to a sintering plant 36, from which the exit gases 29 (containing $SO_2$) are returned to the oxidation roast at 28, as previously described.

According to Fig. 2, the pyrrhotite from the separator 17 is subjected to an oxidation roast 28 followed by a reduction roast 31, as in Fig. 1. In this case, the exit gases 27a from the oxidation roast 27 are passed through the pyrrhotite roaster 28 so as to enrich their $SO_2$ content, the concentrated $SO_2$ gases then passing to the sulfuric acid plant 30. The hot calcine from the reduction 29 passes directly to the low temperature and pressure oxidization leach at 33a for the recovery of elemental sulfur, iron oxide and such copper as was not removed in the flotation step 11.

The leaching operation 33a (Fig. 2) consists essentially of oxidizing a water slurry of pyrrhotite at 105–110° C. and 100 p. s. i. g. oxygen pressure in a stirred autoclave for about one-half hour. Only sulfur combined with pyrrhotite is converted to elemental sulfur. Copper-sulfides are oxidized to sulphates, and the copper is recovered from the autoclave liquor at 38, hydrogen sulfide being fed at 38a to this recovery operation. At the end of the oxidation step the temperature is raised a few degrees for the agglomeration of sulfur. Unleached pyrrhotite or copper-sulfides at the end of the reaction are occluded in the sulfur nodules, due to the tendency of molten sulfur to occlude sulfides in preference to oxides. This leaching operation 33a is described in further detail in an article entitled "The Recovery of Elemental Sulfur From Pyrite and Pyrrhotite," by Downes and Bruce, which appears at pages 127–132 of The Canadian Mining and Metallurgical Bulletin for March 1955.

From the copper recovery operation 38, the material is fed to a filtering step at 39, from which the CuS can be recycled to the oxidation roast at 28.

The residue from the autoclave at 33a, containing sulfur and iron oxide, is separated by flotation at 40. The sulfur or overflow is collected at 41 and passed to the sulfur purification plant 15. The iron oxide or underflow is passed to a sintering plant 42, from which the exit gases (containing $SO_2$) are discharged at 42a and fed at 29 to the oxidation roast 28.

The following is a specific example of the practice of the invention, starting with 100 tons of the concentrate:

100 tons of concentrate are roasted in a non-oxidizing atmosphere. The concentrate contains: 32 t. of copper, 21 t. of iron, 28 t. of sulfur, $19-(X+Y)$ t. of silica gangue material and $(Y+Y)$ t. of precious metals, whereby X is greater than Y. The concentrate consists of the various copper minerals and precious metals previously mentioned. From this concentrate, 6 t. of sulfur are removed to yield a calcine of the desired composition. The amount of excess gas required to remove this amount of sulfur is an experimental figure which depends on various factors, such as the composition of the roasting gas, retention time for the roasting operation, particle size of the charge, critical gas velocity conditions, etc. The calcine obtained from this roast consists of 32 t. of copper, 21 t. of iron, 22 t. of sulfur, $19-(X+Y)$ t. of silica gangue material, $(X+Y)$ t. of precious metals and 6 tons of free sulfur, assuming that all of the sulfur removed from the concentrate was burned to elemental sulfur rather than to sulfur-dioxide. The mineral composition of the calcine is as follows: 40 t. of cuprous-sulfide, 25 t. of pyrrhotite, 6 t. of element sulfur, $19-(X+Y)$ t. of silica gangue material and $(X+Y)$ t. of precious metals in form of molybdenum-sulfide, silver-sulfide, silver and copper-senenides and free gold.

The calcine is subjected to flotations for the separation of its mineral constituents. The products of flotation are: 39.4 t. of cuprous-sulfide together with Y t. of precious metals, 35 t. of pyrrhotite together with 0.6 t. of copper-mineral, 6 t. of elemental sulfur (assuming a 100% recovery), X t. of precious metals (assuming that Y t. of the precious metals remained in the cuprous-sulfide fraction) and $19-(X+Y)$ t. of silica gangue materials. In the above, an arbitrary copper recovery of 98.5% was assumed for demonstrative purposes, and it was further assumed that the pyrrhotite recovery was 100%, thereby making the acid wash of the cuprous-sulfide fraction unnecessary. The cuprous-sulfide and pyrrhotite fractions are treated separately for their metals and sulfur recoveries.

The treatment for the recovery of the metal and sulfur values from 39.4 t. of cuprous-sulfide together with the Y t. of precious metals depends upon practical considerations. If no sulfur-dioxide is required for the production of sulfuric acid, the cuperous-sulfide is given a roast with an excess of carbon-dioxide to produce 39.4 t. of copper-oxide and 7.9 t. of elemental sulfur. The copper-oxide is then treated by conventional means for the recovery of metallic copper and of the precious metals which it contains.

If sulfur-dioxide is required for the production of sulfuric acid, the cuprous-sulfide is given an oxidation roast with the proper amount of air to produce 39.4 t. of copper-oxide and 15.8 t. of sulfur-dioxide. The copper-oxide is obtained as fine powder which subsequently is dissolved in spent electrolyte solution for the electrolytical recovery of its copper content. The Y t. of precious metals present in the cuprous-sulfide are recovered in the mud of the electrolytical cells, although part of the molybdenum and selenium will be recovered from the roasting gases. The amount of sulfur-dioxide produced can be increased or the sulfur-dioxide content from the previous roasting operation can be enriched by admixing part or all of the 6 t. of sulfur previously removed from the calcine to the charge, or by using the roaster exit gases for the pyrrhotite roasting operation. Alternatively, the cuprous-sulfide can be treated as a matte in a converter to produce copper by conventional means. In this case, the sulfur will be recovered from the flue gas only if it is practical to use this gas as feed gas for the roasting of the pyrrhotite. The Y t. of precious metals present in the cuprous-sulfide are recovered in the same manner as mentioned above.

The treatment for the recovery of the metal and sulfur values from the 35 t. of pyrrhotite together with the 0.6 t. of copper mineral also depends upon practical considerations. If no sulfur-dioxide is required for the production of sulfuric-acid, the entire charge of the pyrrhotite is subjected to the low temperature and pressure oxidation leach. The products of this operation are the following: 0.5 t. of copper, assuming a 100% recovery, as copper-sulfate in the leach liquor and as uncovered copper-mineral particles included in the elemental sulfur nodules; 12.6 t. of elemental sulfur, assuming a 90% recovery (the sulfur has to be purified and cleaned from undecomposed copper particles); and 28.5 t. of ferrous-oxide, assuming a 95% iron recovery. The iron-oxide contains 1.4 t. of sulfur, the remaining 10% of the total sulfur of the charge, which has to be removed from the oxide by sintering. The sulfur-dioxide containing roast gases from the sintering operation can be used as feed gas for the roasting of cuprous-sulfide, if this operation is carried out for the production of sulfur-dioxide gas.

If sulfur-dioxide is required for the production of sulfuric-acid the procedure is as follows: The entire charge or part of the charge is given an oxidation roast with the proper amount of air. The pyrrhotite should not be roasted to iron to sulfur molar ratios lower than 1:0.4. Assuming the extreme case where all of the 35 t. of pyrrhotite would be roasted to an iron to sulfur molar ratio of 1:0.4, such a roast would yield 18.2 t. of sulfur-dioxide and a calcine containing 21 t. of iron, 4.9 t. of sulfur and 0.26 t. of copper. The hot calcine is then given a reduction roast to make it amenable for the recovery of iron and sulfur by the low temperature and pressure oxidation leach. The amount of reducing gas required for this operation is an experimental figure. Since the calcine to be reduced has a sufficient heat content, it will heat up the reducing gases to roasting temperature. The hot exit gases from this reduction can in turn be fed into the furnace in which the concentrate is roasted. During the reduction roast the 0.5 t. of copper present in the charge are converted into 0.6 t. of cuprous-sulfide. After the reduction, the pyrrhotite is subjected to the low temperature and pressure oxidation leach. The copper can be removed from the pyrrhotite-calcine by flotation before undergoing the leaching process.

Assuming that the copper is not removed by flotation and the entire calcine is given a low temperature and pressure oxidation leach, and further assuming the same metal and sulfur recoveries as mentioned for the same operation above, the products of this process are the following: 0.5 t. of copper as copper-sulfate or as undecomposed copper-mineral particles included in the elemental sulfur nodules; 4.4 t. of elemental sulfur; and 28.5 t. of ferrous-oxide containing 0.5 t. of sulfur, which have to be removed from the iron-oxide by sintering. The sulfur-dioxide containing roast gases can be used as feed gas for the roasting of the pyrrhotite.

I claim:

1. In the recovery treatment of sulphide or sulfide-oxide ores containing substantial amounts of copper, sulfur and iron, the method which comprises roasting the ore in a reducing atmosphere to form a calcine containing substantial proportions of cuprous-sulphide, pyrrhotite and elemental sulfur, subjecting the calcine to a primary flotation step to separate cuprous-sulfide and sulfur as an overflow from pyrrhotite as an underflow, subjecting said overflow to a second flotation to separate sulfur from cuprous-sulfide, and separately treating said cuprous-sulfide to recover copper oxide and sulfur therefrom.

2. In the recovery treatment of sulphide or sulfide-oxide ores containing substantial amounts of copper, sulfur and iron, the method which comprises roasting the ore in a reducing atmosphere to form a calcine containing substantial proportions of cuprous-sulphide, elemental sulfur and pyrrhotite, subjecting the calcine to a primary flotation step to separate cuprous-sulfide and sulfur as an overflow from pyrrhotite as an underflow, subjecting said overflow to a second flotation to separate sulfur from cuprous-sulfide, subjecting said cuprous-sulfide to an oxidation roast to produce copper oxide and sulfur dioxide, and enriching said sulfur dioxide by recycling it through said oxidation roast.

3. In the recovery treatment of sulphide or sulfide-oxide ores containing substantial amounts of copper, sulfur and iron, the method which comprises roasting the ore in a reducing atmosphere to form a calcine containing substantial proportions of cuprous-sulphide, elemental sulfur and pyrrhotite, subjecting the calcine to a primary flotation step to separate cuprous-sulfide and sulphur as an overflow from pyrrhotite as an underflow, subjecting said overflow to a second flotation to separate sulfur from cuprous-sulfide, and subjecting said cuprous-sulfide to an oxidation roast in the presence of sulfur from said second flotation, to produce copper oxide and enriched sulfur dioxide.

4. In the recovery treatment of sulphide or sulfide-oxide ores containing substantial amounts of copper, sulfur and iron, the method which comprises roasting the ore in a reducing atmosphere to form a calcine containing substantial proportions of cuprous-sulphide, elemental sulfur and pyrrhotite, subjecting the calcine to a primary flotation step to separate cuprous-sulfide and sulfur as an overflow from pyrrhotite as an underflow, subjecting said overflow to a second flotation to separate sulfur from cuprous-sulfide, subjecting said cuprous-sulfide to an oxidation roast to produce copper oxide and sulfur dioxide, roasting said pyrrhotite underflow in an oxidizing atmosphere which includes said last sulfur dioxide, thereby producing an oxidized pyrrhotite calcine and enriching the sulfur dioxide sufficiently for commercial production of sulfuric acid, roasting said last calcine in a reducing atmosphere to reduce the superficially oxidized pyrrhotite particles, and subjecting the reduced calcine to a low temperature and pressure oxidation leach for recovery of sulfur and iron oxide.

5. The method according to claim 4, in which the exit gases from said reduction roasting of the pyrrhotite are fed to said roasting of the ore.

6. The method according to claim 4, comprising also the steps of sintering the sulfur and iron oxide obtained from said oxidation leach, thereby producing sulfur dioxide, and returning said last sulfur dioxide to said oxidation roasting of the pyrrhotite.

References Cited in the file of this patent
UNITED STATES PATENTS

| | | |
|---|---|---|
| 95,307 | Bigelow | Sept. 28, 1869 |
| 466,495 | Herrenschmidt | Jan. 5, 1892 |
| 949,002 | Ramage | Feb. 15, 1910 |
| 1,275,374 | Bradley | Aug. 13, 1918 |
| 1,513,812 | Henderson | Nov. 4, 1924 |
| 2,170,814 | Drapeau | Aug. 29, 1939 |
| 2,733,983 | Daubenspeck | Feb. 7, 1956 |